US Patent Number: 4,491,654
Date of Patent: Jan. 1, 1985
Inventor: Cummings

[54] WATER-INSOLUBLE PHENOL-FORMALDEHYDE-POLYAMINES, METHOD FOR MAKING THEM, CURING OF POLYEPOXIDES AND THE RESULTING PRODUCT

[76] Inventor: Lowell O. Cummings, 133 Crane Dr., San Anselmo, Calif. 94960

[21] Appl. No.: 629,690

[22] Filed: Jul. 11, 1984

Related U.S. Application Data

[63] Continuation-in-part of Ser. No. 401,547, Jul. 26, 1982, abandoned.

[51] Int. Cl.$^3$ .................... C08G 14/06; C08G 14/12
[52] U.S. Cl. .................... 525/490; 525/481; 528/162; 528/163; 528/164; 544/378; 564/306; 564/367; 564/368; 427/386; 428/413; 428/418
[58] Field of Search ............... 528/162, 163, 164; 525/481, 490; 544/398; 564/306, 367, 368; 427/386; 428/413, 418

[56] References Cited

U.S. PATENT DOCUMENTS

| | | | |
|---|---|---|---|
| 2,341,907 | 2/1944 | Cheetham et al. | 524/49 X |
| 2,353,491 | 7/1944 | Oberright | 528/162 X |
| 2,402,384 | 6/1946 | Eastes | 528/162 X |
| 2,546,938 | 3/1951 | Bauman et al. | 528/162 X |
| 2,630,420 | 3/1953 | Gleim | 528/162 X |
| 2,731,425 | 1/1956 | Juda et al. | 528/162 X |
| 2,807,594 | 9/1957 | Haagen | 528/162 X |
| 2,962,442 | 11/1960 | Andress, Jr. | 528/162 X |
| 2,994,669 | 8/1961 | Hader | 528/162 X |
| 3,169,118 | 2/1965 | Kirkpatrick et al. | 528/162 X |
| 3,404,128 | 10/1968 | Radlove et al. | 528/162 X |
| 3,751,471 | 8/1973 | Becker | 564/367 X |
| 4,022,946 | 5/1977 | Cummings | 428/413 |

OTHER PUBLICATIONS

Formaldehyde, 3rd Ed., Walker, p. 364, 1964.

*Primary Examiner*—Howard E. Schain
*Attorney, Agent, or Firm*—Owen, Wickersham & Erickson

[57] ABSTRACT

A water-insoluble curing agent for epoxy resins, made by mixing a major amount by weight of a water-insoluble propylene diamine chosen from the group consisting of the $C_8$ to $C_{20}$ fatty propylene diamines and the $C_{12}$ to $C_{15}$ ether propylene diamines with a minor amount by weight of a water-soluble polyamine suitable for rapid cure of epoxy resins, mixing the resulting mixture with a water-insoluble substituted phenol to give a water-insoluble reaction product, and then reacting said reaction product with formaldehyde. A novel cured epoxy resin is produced by reacting the agent with an uncured epoxy resin, and the reaction can be done in a wet environment or even under water.

27 Claims, No Drawings

WATER-INSOLUBLE PHENOL-FORMALDEHYDE-POLYAMINES, METHOD FOR MAKING THEM, CURING OF POLYEPOXIDES AND THE RESULTING PRODUCT

CROSS-REFERENCE TO RELATED APPLICATION

This application is a continuation-in-part of application Ser. No. 401,547, filed July 26, 1982, now abandoned.

BACKGROUND OF THE INVENTION

This invention relates to an improved method for curing epoxy resin and for making an amine epoxy curing agent that enables the mixture of epoxy resin and its curing agent to be coated on underwater substrates and cured there and also to be coated on wet and damp surfaces and cured there.

Most amine epoxy curing agents are water soluble or at least partly water soluble. Their water solubility renders these prior-art curing agents ineffective for adequate cure of epoxy resins when they are either coated underwater over a substrate or on wet surfaces, because when such cure is attempted, the curing agent partially dissloves in water. As a result, the mixture tends to slip around on the surface and not adhere. In addition, the ratio of epoxy to curing agent has to be altered considerably from the optimum, to accommodate an unknown amount of curing agent that will dissolve in water, and an additional amount of curing agent will therefor be needed. Even then, the results are generally unacceptable.

A good example of curing agents that are partially water soluble are the common amine-amide-dimer acid curing agents known as "polyamide curing agents"; an example of this is Versamid 125 made by Henkel. This material forms a soft jelly-like mass when mixed with water, due to its partial water solubility. When one attempts to coat a mixture of epoxy resin and Versamid 125 under water or on wet surfaces, the coating slips around on the wet surface and cannot make a satisfactory film.

Satisfactory underwater coating, as well as coating on wet or moist surfaces, can be obtained by using the invention described and claimed in my earlier U.S. Pat. No. 4,022,946. The curing agents set forth in that patent are water insoluble or substantially so. Two types are set forth:

(1) amines of the formula

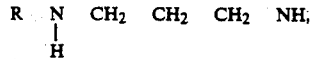

in which R is chosen from the group consisting of ether radicals of which one of the alkyl or alkylene radicals has at least eight carbon atoms, and (2) a condensation product of a small proportion of a polyepoxide having a plurality of vic-epoxy groups and containing only members of the groups consisting of carbon, hydrogen, oxygen, and chlorine, and a larger proportion of the amine of (1) above.

However, the product of U.S. Pat. No. 4,022,946 has many drawbacks. It shows erratic cure, often poor, under ordinary conditions and cures very slowly under cold conditions. The cured film is often soft and low in strength; it exhibits poor chemical resistance and poor resistance to solvents. Its application requires the use of a diluent, because the uncured mixture is very viscous. Propylene glycol, the usual diluent, is approved for use in food handling areas, but it detracts from the desired water insolubility. Finally, the product tends to be expensive, partly because it is usually used in its adduct form, and the adducted epoxy resin is expensive.

Among the objects of the present invention are: the provision of an improved epoxy-resin curing agent having improved water insolubility, and imparting improved water insolubility to the mixture of the resin and curing agent; the provision of an improved agent for curing epoxy resins under water and for adhering them to various substrates, both in moist conditions and under water; the provision of improved cure under ordinary conditions, with more reliability and predictability and better resin adherence; the provision of a product that cures epoxy resins more quickly than comparable products under cold conditions; the provision of a curing agent that imparts to the epoxy resin improved toughness and flexibility even when the curing is done under water, the cured film also having excellent chemical resistance and excellent solvent resistance; the provision of a curing agent requiring no diluents because it has in itself a sufficiently low viscosity, which is controllable; and the provision of a curing agent, usable with epoxy resins under wet or moist conditions, that is less expensive than comparable curing agents.

SUMMARY OF THE INVENTION

The amine curing agent of this invention is essentially water insoluble. This water insolubility is an important property in enabling the mixture of epoxy resin with the curing agent to coat underwater surfaces or wet surfaces.

One ingredient of the amine curing agent is a long-chain water-insoluble alkyl propylene diamine, such as tallow propylene diamine. A second ingredient is a water-insoluble alkyl- or aryl-substituted phenol. These two ingredients are combined by means of formaldehyde to give a water-insoluble polyamine that, when combined with an epoxy resin, coats wet surfaces very well. Reactions of amines or polyamines with phenols by means of formaldehyde is well known, though I am not aware of others having reacted the water-insoluble amines with the water-insoluble substituted phenols.

However, the curing agent as so far described exhibits slow curing properties, so that in difficult curing conditions, such as in cold water, the cure is too slow to be useful. In addition, the films may be soft and may exhibit a low degree of curing.

I have found that I can remedy these deficiencies by incorporating a third ingredient, namely a polyamine known to speed the curing and cross-linking process. This third ingredient is mixed with the alkyl propyldiamine before the reaction with the alkyl- or aryl-substituted phenol. When the reaction is carried out, the fast-curing polyamines are linked together simultaneously with the substituted phenol by means of formaldehyde.

A surprising result of this procedure is that, although the fast-curing polyamines are in themselves water soluble, when they are linked to the large, water-insoluble molecule of the substituted phenol combined with the long chain diamine, the entire molecule is substantially water insoluble.

The amine-phenol-formaldehyde reaction employing other amines and phenols is sometimes referred to as a Mannich Reaction, and many patents have described this type of reaction. End products have been used for ionexchange resins, for lubricating oil additives, for epoxy curing agents, and for many other uses.

In this invention, however, a unique epoxy curing agent that allows underwater application of the epoxy resin is made by use of a reaction that may be classified as a type of Mannich reaction. The invention makes use of a large amount (by weight) of a long-chain, water-insoluble, propylene diamine, a large amount of a water-insoluble substituted phenol, a smaller amount (by weight) of a rapid-curing simple polyamine, and a small amount of formaldehyde. Expressed in molar terms, the two amines may be used in substantially equal amounts, but the long-chain, water-insoluble amine is much heavier than the simple polyamine; so much more of the long-chain amine is used, in terms of weight.

These ingredients are combined in two stages. First, the two polyamines are mixed with the substituted phenol. The phenol and polyamine react together when mixed, forming a salt or complex. This salt or complex is then mixed with formaldehyde (as aqueous formaldehyde or as paraformaldehyde). A mild exotherm takes place upon the addition of the formaldehyde. When the exotherm subsides, the reaction is complete, and the water of condensation plus the introduced water is driven off by conventional means, such as distillation.

The incorporation of phenol or similar compounds with the polyamine enables the formaldehyde to react smoothly to give transparent, low-viscosity liquids which are excellent polyamine epoxy curing agents.

In contrast, it should be noted that if the attempt were made to react formaldehyde with polyamines alone, a very vigorous exotherm would take place and an unusable, high-polymer gel would likely result.

ILLUSTRATIONS OF UNUSABLE REACTIONS

To illustrate the propensity of the reaction of polyamine and formaldehyde to give high exotherms and unusable high polymer gels, the following reactions are shown:

To 103 g. (one mole) of diethylene triamine, $H_2NCH_2CH_2NHCH_2CH_2NH_2$, in a glass reaction flask stirred with a paddle stirrer, was added 66 g. (two moles) of 91% paraformaldehyde. The temperature rose from 20° C. to 140° C. in about one minute, while violent boiling and refluxing took place. The color changed from light yellow to red and considerable amount of dark brown, hard infusible gel formed.

As a second example, a 70% solution of hexamethylene diamine in water was stirred at room temperature while 37% formalin was added. A white insoluble precipitate or gel formed at once throughout the whole mass, and the mass became quite warm. This white precipitate was insoluble in many strong solvents and reagents, including epoxy resins.

This same type of hexamethylene diamine formaldehyde precipitate or gel is described in the book: *Formaldehyde* by J. Frederick Walker, third edition, Robert E. Krieger Publishing Co., page 364, where this same reaction is described "giving a colorless, voluminous, elastic product which is insoluble in water and organic compounds."

DESCRIPTION OF SOME PREFERRED EMBODIMENTS OF THE INVENTION

In contrast, as shown in the examples below of the present invention, the amines react smoothly with formaldehyde when they are first mixed with the substituted phenol.

The approximate structure resulting from this reaction is:

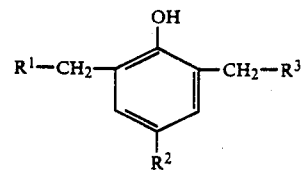

$R^1$ and $R^3$ may be present in various ratios their respective positions; in other words the product may be a mixture of specific compounds. $R^2$ will always be present in a 1:1 ratio with the phenol ring.

$R^1$ is chosen from the group consisting of radicals of certain polyamines, namely:

—NH(CH$_2$)$_6$NH$_2$ (from hexamethylene diamine)
—NH(CH$_2$)$_2$NH$_2$ (from ethylene diamine)
—NH(CH$_2$)$_2$NH(CH$_2$)$_2$NH$_2$ (from diethylene triamine)
—NH(CH$_2$)$_2$NH(CH$_2$)$_2$(NH(CH$_2$)$_2$NH$_2$)$_x$
 where x = 1 = triethylene tetramine,
 or x = 2 = tetraethylene pentamine

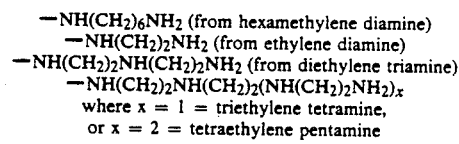

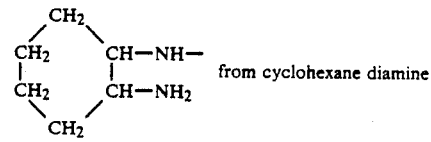

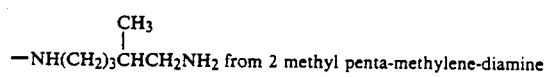

—NH—(CH$_2$)$_6$NH—(CH$_2$)$_6$NH$_2$ from hexamethylene triamine

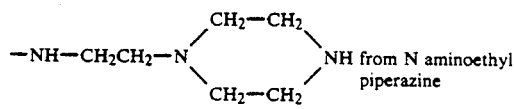

$R^2$ is chosen from the group consisting of alkyl or aryl groups on the ring of the phenol, namely C$_4$H$_9$ butyl
C$_5$H$_{11}$ amyl
C$_6$H$_{13}$ hexyl
C$_7$H$_{15}$ heptyl
C$_8$H$_{17}$ octyl
C$_9$H$_{19}$ nonyl
C$_{10}$H$_{21}$ decyl
C$_{11}$H$_{23}$ undecyl
C$_{12}$H$_{25}$ dodecyl

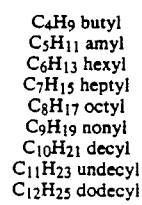phenyl $R^3$ is a $C_8$ to $C_{20}$ fatty propylene diamine radical or a $C_{12}$ to $C_{15}$ ether propylene diamine radical. The formula for these fatty propylene diamine radicals is $R^4NH(CH_2)_3NH-$, where $R^4$ is an alkyl of $C_8$ to $C_{20}$. The formula for the ether propylene diamine radical is $R^5O(CH_2)_3NH(CH_2)_3NH-$, where $R^5$ is a $C_{12}$ to $C_{15}$ alkyl.

As is shown in the examples below, nonylphenol is a particularly good phenol to use in this reaction because of its wide availability and low cost. Also, nonylphenol contributes good flow properties to the final epoxy mixture.

Hexamethylenediamine is a particularly good amine to use because it promotes fast curing when included in the curing agents of this invention. This fast curing is apparently due to the fact that hexamethylenediamine is an extremely basic amine compared to other polyamines. This highly basic characteristic promotes reaction with the epoxide groups of the epoxide resin and hence effects curing under adverse conditions where other polyamines, being less basic do not cure with the same energy.

The basic characteristics can be measured by noting the base dissociation constants of the amines. The larger the base dissociation constants, $K_B1$ and $K_B2$, the stronger the base. For example:

|  | $K_B1$ | $K_B2$ |
|---|---|---|
| Hexamethylenediamine | $7.19 \times 10^{-3}$ | $5.78 \times 10^{-4}$ |
| Ethylene diamine | $5.5 \times 10^{-4}$ | $3.6 \times 10^{-7}$ |

Thus, $K_B1$ for hexamethylenediamine is more than ten times as strong as $K_B1$ for ethylene diamine, and the $K_B2$ for the former is more than a thousand times as great as for the latter.

However, it has been noted that hexamethylenediamine results in some yellowing of the cured epoxy resin. Where this yellowing is objectionable, the use of diethylene triamine may be preferred.

A rather surprising aspect of the addition of formaldehyde to the substituted phenol-polyamine mixture is that the viscosity of the curing agent can be varied over a wide range merely by varying the amount of formaldehyde. As the amount of formaldehyde is a small portion of the total curing agent, the variation of the amount of formaldehyde does not greatly alter the total composition. This means that, for example, a change in formaldehyde content from 5% to 10% can change the viscosity from one poise to eighty poises and so affords a very convenient way of obtaining a desired viscosity.

Formalin and paraformaldehyde are equally suitable for the chemical reaction with the phenol-polyamine combination. However, paraformaldehyde is preferred from the manufacturing aspect because it is a solid form of formaldehyde and does not introduce large amounts of water, as does formalin. The use of paraformaldehyde with the phenol-polyamine combination also results in a very short reaction time in the reaction kettle.

Among the suitable long-chain, water-insoluble diamines are what are known "fatty propyl diamines" and "ether propylene diamines". The former group includes diamines made from tallow, tall oil, coconut oil, and oleic acid. The latter group includes tridecyl ether diamine and a $C_{12}$–$C_{15}$ ether diamine. Tallow propylene diamine is the least expensive and therefore may generally be preferred.

The Adogen products of this type from Sherex are quite good. Other companies make identical fatty propylene diamines, such as Azko Chemie (formerly Armak) and Humko Chemical Division, Witco Chemical Corp. Sherex is the one of the few suppliers of ether propylene diamines.

The following two tables list preferable such diamines and gives some of their properties. In the headings giving the formulas, the R in the fatty propylene diamines is a $C_8$ to $C_{20}$ alkyl radical; the R in the ether propylene diamines is a $C_{12}$ to $C_{15}$ alkyl radical.

TABLE I

| Description | Total Amine Value | Secondary Tertiary Amine Value | Gardner Color 1963 (Max.) | Iodine Value | Percent Moisture (Max.) | Approx. Combining Weight | Physical Appearance @ 25° |
|---|---|---|---|---|---|---|---|
| A. FATTY PROPYLENE DIAMINES - $RNH(CH_2)_3NH_2$: | | | | | | | |
| Hydrogenated Tallow Propylene Diamine | 325–355 | 160–175 | 5 | 5 Max. | 1.0 | 165 | White Flakes |
| Tall Oil Propylene Diamine | 320–340 | 155–170 | 8 | 85 Min. | 1.0 | 170 | Amber Liquid |
| Coco Propylene Diamine | 410–435 | 200–220 | 6 | 12 Max. | 1.0 | 137 | Amber Liquid |
| Tallow Propylene Diamine | 325–350 | 155–175 | 5 | 30–45 | 1.0 | 165 | Amber Solid |
| Oleyl Propylene Diamine | 320–340 | 150–175 | 5 | 70–85 | 1.0 | 170 | Amber Liquid |
| B. ETHER PROPYLENE DIAMINES - $RO(CH_2)_3NH_2$: | | | | | | | |
| Tridecyl Ether Propylene Diamine | 325–340 | 150–165 | 4 | | 1.0 | 168 | Amber Liquid |
| $C_{12}$–$C_{15}$ Ether Propylene Diamine | 322 MIN. | 151 MIN. | 1 | | 1.0 | 174 | White Paste |

TABLE II

Chain Length Composition of R Group

A. FATTY PROPYLENE DIAMINES - $RNH(CH_2)_3NH_2$:

Approximate Chain Length Composition of R Group (%)

TABLE II-continued

| | Chain Length Composition of R Group | | | | | | | | |
|---|---|---|---|---|---|---|---|---|---|
| Description | C-8 | C-10 | C-12 | C-14 | C-16 | C-18 | C-18' | C-18" | C-20 |
| Hydrogenated Tallow Propylene Diamine | | | | 5 | 30 | 65 | | | |
| Tall Oil Propylene Diamine | | | | | | 3 | 49 | 43 | 5 |
| Coco Propylene Diamine | 5 | 7 | 50 | 18 | 10 | 6 | 4 | | |
| Tallow Propylene Diamine | | | | 5 | 30 | 20 | 45 | | |
| Oleyl Propylene Diamine | | | | | 5 | 20 | 75 | | |

B. ETHER PROPYLENE DIAMINES - $RO(CH_2)_3NH(CH_2)_3NH_2$:

| | Approximate Chain Length Composition of R Group (%) | | | |
|---|---|---|---|---|
| Description | C-12 | C-13 | C-14 | C-15 |
| Tridecyl Ether Propylene Diamine | | 99 | | |
| $C_{12}$–$C_{15}$ Ether Propylene Diamine | 25 | 39 | 21 | 15 |

These fatty diamines are N-alkyl-1, 3-propylene diamines. Since these diamines contain both primary and secondary amine groups, they are strong bifunctional bases, exhibiting greater cationic surface activity than the primary amine from which they are derived.

In addition, their adsorption characteristics enable them to bond strongly to relatively negatively-charged surfaces such as metals, textiles, plastics, mineral ores, and the like. These adsorption characteristics are carried over to and are present in the curing agents of this invention, for the long-chain phenols have similar characteristics, and the two enhance each other.

The fatty propylene diamines presently commercially available are derived from tallow, tall oil, coconut oil, and oleic acid. Diamines from other natural fats can be obtained.

The ether propylene diamines are derived from alcohols rather than fatty acids. The introduction of the ether linkage into the molecule renders these products more liquid than conventional fatty amines and gives them much lower pour points. The ether diamines show adsorption characteristics and water insolubilities very similar to those of the fatty propylene diamines.

The ether propylene diamines commercially available are based on alkyl chain lengths from $C_8$–$C_{15}$.

Commercial grade hexamethylene triamine is a by-product of hexamethylene diamine manufacture. It is a dark liquid with the following composition:
  Bis-hexamethylene triamine (BHMT): 20–30%
  C-10 diamines: 15–25%
  lower amines and nitriles: 5–10%
  high boilers (relative to BHMT): 40–60%

DESCRIPTION OF SOME PREFERRED EMBODIMENTS

A typical procedure according to the present invention is to charge the substituted phenol and the polyamines into a kettle at room temperature. If the fatty propylene diamine is solid at room temperature, it is melted and poured into the kettle. This may raise the mix temperature somewhat. When these chemicals are mixed, a salt or complex forms raising the temperature several degrees. Then paraformaldehyde is added, and the temperature is raised to about 75° C. At this temperature the paraformaldehyde begins to dissolve, and heating is discontinued, and a mild exotherm raises the temperature to about 100° C. The exotherm soon subsides leaving a transparent liquid containing some added water (if any) and the water of reaction form the chemical combination of the paraformaldehyde with both the polyamine and the phenol.

Then the water is driven off, for example, by heating to 120° C., sparging with nitrogen or applying a vacuum or a combination of sparging and application of vacuum. Once the water is removed, the reaction is complete. Typical reaction times are two to four hours.

The following examples illustrate the invention. In all examples the manufacturing process was as follows:

A glass reaction flask was fitted with a stainless steel paddle stirrer, thermometer, and distillation apparatus which can be used to distill at atmospheric pressure or under vacuum. The polyamines and substituted phenol are added to the flask and are stirred a short time at room temperature until an exotherm takes place. Stirring is continued, and heat is applied. Paraformaldehyde (or formalin, if desired) is then added, and stirring and heating are continued until the temperature is about 75° C. The heating is then discontinued, while a mild exotherm takes place and the paraformaldehyde dissolves. Heat is again applied to distill off the added water (if any) and the water of reaction. Vacuum is also used to speed removal of water.

A gel time test is preferably made to evaluate the curing properties. This may be done by mixing the completed curing agent with 50 g. of liquid epoxy resin of the bisphenol diglycidyl ether type with a weight per epoxy of about 190. The amount of underwater curing agent used with the 50 g. epoxy resin was about 50 g. and was only approximately stoichiometric. The gel time at standard temperature is noted.

To find the optimum properties of any one mixture of curing agent and epoxy resin, several variations from the starting ratio should be made.

In order to evaluate the ability of an amino-epoxy mix to be coated under water and also, therefore, its ability to coat wet and damp surfaces, a test was devised.

Fifty grams of a liquid epoxy resin (WPE 190) is mixed with fifty grams of the amine curing agent. After thorough mixing, the container and mixed epoxy-amine are placed underwater. A test panel, for example a steel panel, is also placed underwater. A portion of the epoxy-amine mix is removed from the container by a spatula or similar object, and the mix is spread onto the panel underwater to make a film on it. The test is passed if the film adheres well and does not pull away from the panel. All the examples below passed this test.

The following examples illustrate the invention:

| Example No. | Propylene Diamine ($R^3$) | Fast Curing Amine ($R^1$) | Substituted Phenol | Paraformaldehyde (PF) | Yield | Viscosity at 25° C. (Poises) | Appearance |
|---|---|---|---|---|---|---|---|
| 1. | Tallow propylene diamine Adogen 570S Sherex 400 g. 1.25 moles $C_{18}H_{35}-\overset{H}{N}(CH_2)_3NH_2$ | 70% hexamethylene diamine in water 415 g. (290 g. 100%) 2.5 mole | nonyl phenol 550 g. 2.5 moles | 99 g. 91% PF 90 g. 100% $CH_2O$ 3 moles of $CH_2O$ | 1271 g. | 2.8 | yellow transparent liquid |

$R^3$    $R^1$
1.25 moles:2.5 moles
400 g.:290 g.    Still more weight of $R^3$ than $R^1$.

This shows $R^1$, a phenol with $R^2$, and $R^3$ the main point of the invention. This uses more nonyl phenol than the later examples use. However, note 3 moles of $CH_2O$. Note viscosity is 2.8 poise.

| Example No. | Propylene Diamine ($R^3$) | Fast Curing Amine ($R^1$) | Substituted Phenol | Paraformaldehyde (PF) | Yield | Viscosity at 25° C. (Poises) | Appearance |
|---|---|---|---|---|---|---|---|
| 2. | Tallow propylene diamine Adogen 570S Sherex $C_{18}H_{35}-\overset{H}{N}(CH_2)_3NH_2$ 400 g. 1.25 moles | 70% hexamethylene diamine in water 415 g. (290 g. 100%) 2.5 mole | nonyl phenol 550 g. 2.5 moles | 141 g. 91% PF 128 g. 100% $CH_2O$ moles 4.25 moles of $CH_2O$ | — | 14.8 | yellow transparent liquid |
| 3. | Tallow propylene diamine Adogen 570S Sherex $C_{18}H_{35}-\overset{H}{N}(CH_2)_3NH_2$ 400 g. 1.25 moles | 70% hexamethylene diamine in water 415 g. (290 g. 100%) 2.5 mole | nonyl phenol 550 g. 2.5 moles | 180 g. 91% PF 164 g. 100% $CH_2O$ 5.46 moles of $CH_2O$ | 1302 g. | 62 | yellow transparent liquid |

In other words, the viscosity can be adjusted by varying the $CH_2O$.

| | | | | | | | |
|---|---|---|---|---|---|---|---|
| 4. | Tall oil propylene diamine Adogen 551 Sherex $C_{18}H_{35}-\overset{H}{N}(CH_2)_3NH_2$ 188 g. 0.56 moles | 70% hexamethylene diamine in water 90 g. (62.5 g. 100%) 0.53 mole | nonyl phenol 250 g. 1.14 moles | 2.56 91% PF 22.75 g. 100% $CH_2O$ 0.75 moles | 512 g. | | yellow transparent liquid |

About same moles of $R^3$ to $R^1$ but weight ratio much more with $R^3$.

| | | | | | | | |
|---|---|---|---|---|---|---|---|
| 5. | Oleyl propyl diamine Adogen 572 Sherex $C_{18}H_{35}-\overset{H}{N}(CH_2)_3NH_2$ | 70% hexamethylene diamine in water 90 g. (62.5 g. 100%) 0.53 mole | nonyl phenol 250 g. 1.14 moles | 2.56 91% PF 22.75 g. 100% $CH_2O$ 0.75 moles | 512 g. | | yellow transparent liquid |

-continued

| | Propylene Diamine (R³) | Fast Curing Amine (R¹) | Substituted Phenol | Para-formaldehyde (PF) | Yield | Viscosity at 25° C. (Poises) | Appearance |
|---|---|---|---|---|---|---|---|
| | 188 g. 0.56 moles | | | | | | |
| | About same moles of R³ to R¹ but weight ratio much more with R³. | | | | | | |
| 6. | Hydrogenated tallow diamine Adogen 540 Sherex $$C_{18}H_{37}-\overset{H}{\underset{|}{N}}(CH_2)_3NH_2$$ | 70% hexamethylene diamine in water 90 g. (62.5 g. 100%) 0.53 mole | nonyl phenol 250 g. 1.14 moles | 25.6 91% PF 22.75 100% CH₂O 0.75 moles | 512 g. | | yellow transparent liquid |
| | 188 g. 0.56 moles | | | | | | |
| | About same moles of R³ to R¹ but weight ratio much more with R³. | | | | | | |
| 7. | Coco diamine Adogen 560 Sherex $$C_{14}H_{29}-\overset{H}{\underset{|}{N}}(CH_2)_3NH_2$$ | 70% hexamethylene diamine in water 90 g. (62.5 g. 100%) 0.53 moles | nonyl phenol 250 g. 1.14 moles | 25.6 91% PF 22.75 100% CH₂O 0.75 moles | 512 g. | | yellow transparent liquid |
| | 150 g. 0.56 moles | | | | | | |
| | About same moles of R³ to R¹ but weight ratio much more with R³. | | | | | | |
| 8. | Tridecyl ether diamine $C_{13}H_{27}-O-(CH_2)_3-NH-(CH_2)_3NH_2$ 188 g. 0.56 moles | 70% hexamethylene diamine in water 83 g. (58 g. 100%) 0.5 moles | nonyl phenol 143 g. 0.66 moles | 22 g. 91% PF 20 g. 100% CH₂O 0.66 moles | 366 g. | 1.6 | yellow transparent liquid |
| 9. | Tallow propylene diamine 160 g. 0.5 moles | hexamethylene triamine 80 g. 0.5 mole | nonyl phenol 143 g. 0.66 mole | 33 g. 91% PF 30 g. 100% CH₂O 1 mole | 396 g. | 19 | tan-brown transparent liquid |
| 10. | Tallow propylene diamine 220 g. 0.67 mole | diethylene triamine 52 g. 0.5 mole | nonylphenol 220 g. 1 mole | 49.5 g. 91% PF 45 g. 100% CH₂O 1.5 mole | 537 g. | 6.5 | tan-brown transparent liquid |
| 11. | Tallow propylene diamine 220 g. 0.67 mole | N—aminoethyle piperazine 65 g. | nonylphenol 220 g. 1 mole | 49.59 91% PF 45 g. 100% CH₂O 1.5 mole | 550 g. | 10 | tan-brown transparent liquid |
| 12. | Adogen 585 (R³) (C₁₂-C₁₅ ether diamine) 174 g. 0.5 mole | 2-methylpentamethylene diamine 58 g. 0.5 mole | nonyl phenol 143 g. 0.66 mole | 33 g. 91% PF 30 g. 100% CH₂O 1 mole | 396 g. | | tan-brown transparent liquid. |
| 13. | Tallow propylene diamine 160 g. 0.5 mole | 70% hexamethylene diamine 83 g. 0.5 mole | teriary butyl phenol* 100 g. 0.66 mole | 33 g. 91% PF 30 g. 100% CH₂O 1 mole | 396 g. | | tan-brown transparent liquid |
| *This phenol is an inexpensive widely used phenol. | | | | | | | |
| 14. | Tallow propylene diamine 160 g. 0.5 mole | 70% hexamethylene diamine 83 g. 0.5 mole | octyl phenol* 136 g. 0.66 mole | 33 g. 91% PF 30 g. 100% CH₂O 1 mole | 396 g. | | tan-brown transparent liquid |
| *This is also a common, commercially available phenol. | | | | | | | |

The table does not exhaust the permutations of the invention. For example, any of the amines named in the table can be used with any of the phenols and related compounds named therein. Also different proportions can be used, depending on the results desired.

I claim:

1. 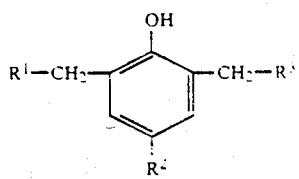

$R^1$ being chosen from the group consisting of:

—NH(CH$_2$)$_6$NH$_2$
—NH(CH$_2$)$_2$NH$_2$
—NH(CH$_2$)$_2$NH(CH$_2$)$_2$NH$_2$
—NH(CH$_2$)$_2$NH(CH$_2$)$_2$(NH(CH$_2$)$_2$NH$_2$)$_x$
where x = 1 or 2,

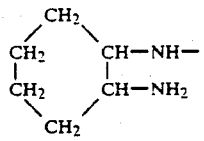

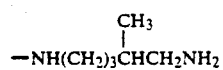

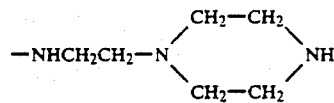

—NH—(CH$_2$)$_6$NH—(CH$_2$)$_6$NH$_2$

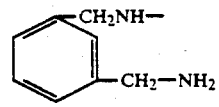

$R^2$ being chosen from the group consisting of C$_4$ to C$_{12}$ alkyl groups and the phenyl group on the ring of the phenol, and $R^3$ being chosen from the group consisting of fatty propylene diamine radicals, R$^4$NH(CH$_2$)$_3$NH—, where R$^4$ is a C$_8$ to C$_{20}$ alkyl radical, and ether propylene diamine radicals, R$^5$O(CH$_2$)$_3$NH(CH$_2$)$_3$NH—, where R$^5$ is a C$_{12}$ to C$_{15}$ alkyl radical.

2. The composition of claim 1 where the average values of $R^1$ and $R^3$ vary from 1:1.

3. The composition of claim 1, in which
$R^1$ is —NH(CH$_2$)$_6$NH$_2$ and
$R^2$ is C$_9$H$_{19}$.

4. The composition of claim 3, in which $R^3$ is tallow propylene diamine.

5. The composition of claim 3, in which $R^3$ is chosen from the group consisting of tallow propylene diamine, tall oil propylene diamine, oleyl propylene diamine, hydrogenated tallow propylene diamine, and coco propylene diamine.

6. The composition of claim 2, in which $R^3$ is tridecyl ether propylene diamine.

7. The composition of claim 1, in which
$R^1$ is —NH(CH$_2$)$_2$NH(CH$_2$)$_2$NH$_2$ and
$R^2$ is C$_9$H$_{19}$.

8. The composition of claim 7 in which $R^3$ is chosen from the group consisting of tallow propylene diamine, tall oil propylene diamine, oleyl propylene diamine, hydrogenated tallow propylene diamine, and coco propylene diamine.

9. The composition of claim 1, in which $R^1$ is

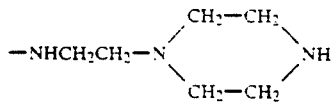

$R^2$ is C$_9$H$_{19}$, and
$R^3$ is chosen from the group consisting of tallow propylene diamine, tall oil propylene diamine, oleyl propylene diamine, hydrogenated tallow propylene diamine, and coco propylene diamine.

10. The composition of claim 1, in which $R^1$ is

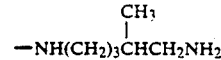

$R^2$ is C$_9$H$_{19}$, and
$R^3$ is C$_{12}$–C$_{15}$ ether propylene diamine.

11. The composition of claim 1, in which
$R^1$ is —NH(CH$_2$)$_6$NH—(CH$_2$)$_6$NH$_2$,
$R^2$ C$_8$H$_{17}$, and
$R^3$ tallow propylene diamine.

12. The composition of claim 1, in which
$R^1$ is —NH(CH$_2$)$_6$NH—(CH$_2$)$_6$NH$_2$,
$R^2$ C$_4$H$_9$, and
$R^3$ tallow propylene diamine.

13. A cured epoxy resin consisting essentially of the reaction product of an uncured epoxy resin and the composition of claim 1.

14. A method for making a curing agent for epoxy resins, comprising the steps of:
mixing a major amount by weight of a water-insoluble propylene diamine chosen from the group consisting of the C$_8$ to C$_{20}$ fatty propylene diamines and the C$_{12}$ to C$_{15}$ ether propylene diamines with a minor amount by weight of a water-soluble polyamine suitable for rapid cure of epoxy resins,
mixing the resulting mixture with a water-insoluble substituted phenol to give a water-insoluble reaction product, and then
reacting said reaction product with formaldehyde to give said curing agent.

15. The method of claim 14 wherein said reacting step is followed by removal of any residual contained water.

16. The method of claim 14 wherein said formaldehyde is used in the form of dry powdered paraformaldehyde.

17. The method of claim 14 wherein said polyamine is one or more amine chosen from the group consisting of ethylene diamine, diethylene triamine, triethylene tetramine, tetraethylene pentamine, hexamethylene diamine, hexamethylene triamine, cyclohexane diamine, 2-methyl pentamethylene diamine, meta xylene diamine, and N-aminoethyl piperazine.

18. The method of claim 14 wherein said propylene diamine is tridecyl ether diamine.

19. The method of claim 14 wherein said propylene diamine is tallow propylene diamine.

20. The method of claim 14 wherein said propylene diamine is chosen form the group consisting of tallow propylene diamine, hydrogenated tallow propylene diamine, tall oil propylene diamine, coco propylene diamine, oleyl propylene diamine.

21. The method of claim 14 wherein said substituted phenol is nonyl phenol.

22. A method for obtaining a cured epoxy resin coating; comprising following the last step of claim 14 with the steps of mixing the curing agent with uncured epoxy resin and then applying the resultant mixture to a substrate and curing it there on by leaving it there for the cure time.

23. A method for curing an epoxy resin which is workable not only on dry substrates but also on a moist substrate or one which may be underwater, comprising mixing said epoxy resin with

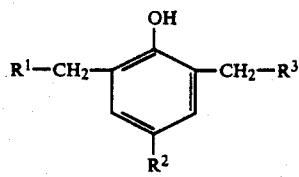

$R^1$ being chosen from the group consisting of:

—NH(CH$_2$)$_6$NH$_2$
—NH(CH$_2$)$_2$NH$_2$
—NH(CH$_2$)$_2$NH(CH$_2$)$_2$NH$_2$
—NH(CH$_2$)$_2$NH(CH$_2$)$_2$(NH(CH$_2$)$_2$NH$_2$)$_x$
where x = 1 or 2,

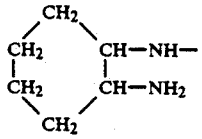

-continued

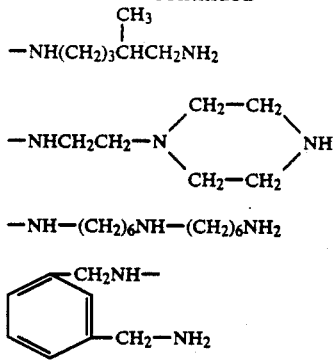

$R^2$ being chosen from the group consisting of $C_4$ to $C_{12}$ alkyl groups and the phenyl group on the ring of the phenol, and $R^3$ being chosen from the group consisting of fatty propylene diamine radicals, $R^4$NH(CH$_2$)$_3$NH—, where $R^4$ is $C_8$ to $C_{20}$ alkyl radical, and ether propylene diamine radicals, $R^5$O(CH$_2$)$_3$NH(CH$_2$)$_3$NH—, where $R^5$ is a $C_{12}$ to $C_{15}$ alkyl radical, coating said mixture on said substrate.

24. The method of claim 23 in which $R^3$ is chosen from the group consisting of tallow propylene diamine, hydrogenated tallow diamine, tall oil propylene diamine, oleyl propylene diamine, and coco propylene diamine.

25. The method of claim 24 in which $R^2$ is nonylphenol.

26. The method of claim 25 in which $R^1$ is hexamethylene diamine.

27. The method of claim 25 in which $R^1$ is diethylenetriamine.

* * * * *

UNITED STATES PATENT AND TRADEMARK OFFICE
CERTIFICATE OF CORRECTION

PATENT NO. : 4,491,654
DATED      : January 1, 1985
INVENTOR(S): Lowell O. Cummings It is certified that error appears in the above-identified patent and that said Letters Patent are hereby corrected as shown below:

Column 11, Example 8, first column, "Tridecyl ether diamine" should be --Tridecyl ether propylene diamine--.

Column 11, Example 12, first column, "...ether diamine..." should be --ether propylene diamine--.

Column 14, line 63, which is claim 18, line 2, after "ether" insert --propylene--.

Signed and Sealed this

Thirtieth Day of July 1985

[SEAL]

Attest:

DONALD J. QUIGG

Attesting Officer        Acting Commissioner of Patents and Trademarks